(12) United States Patent
Nunome et al.

(10) Patent No.: US 11,476,906 B2
(45) Date of Patent: Oct. 18, 2022

(54) BASE STATION, TERMINAL, AND COMMUNICATION METHOD

(71) Applicant: Panasonic Intellectual Property Corporation of America, Torrance, CA (US)

(72) Inventors: Tomoya Nunome, Ishikawa (JP); Hidetoshi Suzuki, Kanagawa (JP); Takashi Iwai, Ishikawa (JP); Ayako Horiuchi, Kanagawa (JP); Yoshihiko Ogawa, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 17/258,560

(22) PCT Filed: Apr. 4, 2019

(86) PCT No.: PCT/JP2019/014926
§ 371 (c)(1),
(2) Date: Jan. 7, 2021

(87) PCT Pub. No.: WO2020/012736
PCT Pub. Date: Oct. 16, 2020

(65) Prior Publication Data
US 2021/0159952 A1    May 27, 2021

(30) Foreign Application Priority Data

Jul. 10, 2018  (JP) .............................. JP2018-130546

(51) Int. Cl.
H04B 7/00      (2006.01)
H04B 7/0456    (2017.01)
H04W 72/04     (2009.01)

(52) U.S. Cl.
CPC ........ *H04B 7/0456* (2013.01); *H04W 72/042* (2013.01)

(58) Field of Classification Search
CPC ........ G06Q 10/20; H05B 47/19; H05B 47/22; H05B 7/0456; G01W 1/16; H04W 72/042
See application file for complete search history.

(56) References Cited

U.S. PATENT DOCUMENTS

2016/0302174 A1* 10/2016 Chatterjee ............ H04B 7/0486
2018/0324770 A1* 11/2018 Nogami ................ H04L 5/0007
(Continued)

OTHER PUBLICATIONS

3GPP TR 38.913 V14.3.0, "3rd Generation Partnership Project; Technical Specification Group Radio Access Network; Study on Scenarios and Requirements for Next Generation Access Technologies; (Release 14)," Jun. 2017, 39 pages.
(Continued)

*Primary Examiner* — Curtis B Odom
(74) *Attorney, Agent, or Firm* — Seed IP Law Group LLP

(57) ABSTRACT

Provided is a base station capable of appropriately applying precoding to a PDCCH. At the base station (100), a precoding control unit (105) sets a precoding granularity, which indicates a period in which the same precoding is used, to multiple control channels respectively disposed in different time resources. A transmission unit (108) transmits signals of the multiple control channels to a terminal (200) on the basis of the set precoding granularity.

4 Claims, 10 Drawing Sheets

(56) References Cited

U.S. PATENT DOCUMENTS

2020/0092946 A1* 3/2020 Xiong .................. H04L 1/0071
2021/0126759 A1* 4/2021 Chen ..................... H04L 5/0048

OTHER PUBLICATIONS

Intel Corporation, "On NR PDCCH repetitions for URLLC," R1-1804741, Agenda item: 7.2.3, 3GPP TSG RAN WG1 Meeting #92bis, Sanya, China, Apr. 16-20, 2018, 8 pages.
International Search Report, dated Jun. 25, 2019, for International Application No. PCT/JP2019/014926, 1 page.
Nokia, Nokia Shanghai Bell, "Remaining details on PDCCH structure," R1-1720506, Agenda item: 7.1.3.1, 3GPP TSG RAN WG1 Meeting 91, Reno, USA, Nov. 27-Dec. 1, 2017, 3 pages.
NTT Docomo, Inc., "Offline summary for AI 7.1.3.1.1 PDCCH structure," R1-1807636, Agenda Item: 7.1.3.1.1, 3GPP TSG RAN WG1 Meeting #93, Busan, South Korea, May 21-25, 2018, 34 pages.
NTT Docomo, "Revision of SI: Study on New Radio Access Technology," RP-161596, Agenda Item: 9.2.2, 3GPP TSG RAN Meeting #73, New Orleans, USA, Sep. 19-22, 2016, 7 pages.

* cited by examiner

| AL | Granularity |
|---|---|
| AL < 8 | 7 symbols |
| AL ≧ 8 | 14 symbols |

FIG. 8

| REG bundle size | Granularity |
|---|---|
| 2 or 3 REG | 14 symbols |
| 6 REG | 7 symbols |

| The number of symbols in a CORESET | Granularity |
|---|---|
| 1 symbol | 4 symbols |
| 2 symbols | 7 symbols |
| 3 symbols | 14 symbols |

| Frequency domain granularity | Time domain granularity |
|---|---|
| Same as REG bundle | 14 symbols |
| All contiguous RBs | 7 symbols |

FIG. 13

| Frequency domain granularity | Time domain granularity |
|---|---|
| Same as REG bundle | 7 symbols |
| All contiguous RBs | 14 symbols |

FIG. 14

BASE STATION, TERMINAL, AND COMMUNICATION METHOD

TECHNICAL FIELD

The present disclosure relates to a base station, a terminal, and a communication method.

BACKGROUND ART

A communication system referred as the 5th generation mobile communication system (5G) has been studied. In 5G, it has been studied to flexibly provide functions for each use case requiring an increase in communication traffic, an increase in the number of terminals to be connected, as well as high reliability, and low latency. Three representative use cases are Enhanced Mobile Broadband (eMBB), massive Machine Type Communications (mMTC), and Ultra Reliable and Low Latency Communications (URLLC). In the 3rd Generation Partnership Project (3GPP), which is an international standardization organization, advancement of the communication system has been studied from both sides; enhancing the LTE system, and New Radio access technology (NR) (see Non Patent-Literature, (hereinafter, referred as "NPL") 1, for example).

URLLC is required to satisfy at the same time the "high reliability" of a packet transmission error rate of 0.001% or less for a 32-byte packet and the "low latency" of 1 ms or less for a radio interval (see NPL 2, for example). A data channel (e.g., PDSCH: Physical Downlink Shared Channel) in which packets are transmitted is scheduled by control information indicated by using a downlink control channel (e.g., PDCCH: Physical Downlink Control Channel). Thus, in URLLC, the reliability equal or more than that of the data channel is required in PDCCH.

CITATION LIST

Non-Patent Literature

NPL 1
RP-161596, "Revision of SI: Study on New Radio Access Technology", NTT DOCOMO, September 2016
NPL 2
3GPP TR38.913 V14.3.0, "Study on Scenarios and Requirements for Next Generation Access Technologies (Release 14)", 2017-06
NPL 3
R1-1804741, "On NR PDCCH repetitions for URLLC", Intel Corporation, April 2018

SUMMARY OF INVENTION

Precoding to improve channel estimation accuracy or performance by space diversity effect is also effective for reception performance improvement of PDCCH. However, the method for applying precoding to PDCCH has not been extensively studied.

One non-limiting and exemplary embodiment of the present disclosure facilitates providing a base station, a terminal and a communication method each making it possible to appropriately apply precoding to PDCCH.

A base station according to one aspect of the present disclosure includes: a control circuit that configures a precoding granularity indicating the periods in which the same precoding is used to each control channel arranged in different time resources, and a transmission circuit that transmits signals of the control channels to a terminal based on the configured precoding granularity.

A terminal according to one aspect of the present disclosure includes: control circuitry, which, in operation, identifies a precoding granularity indicating a period in which the same precoding is applied, the precoding granularity being configured for a plurality of control channels mapped in different time resources; and reception processing circuitry, which, in operation, performs reception processing on a signal of the plurality of control channels transmitted from a base station, based on the identified precoding granularity.

A communication method according to one aspect of the present disclosure includes: configuring a precoding granularity indicating a period in which the same precoding is used, for a plurality of control channels mapped in different time resources; and transmitting a signal of the plurality of control channels to a terminal based on the configured precoding granularity.

A communication method according to one aspect of the present disclosure includes: identifying a precoding granularity indicating a period in which the same precoding is used, the precoding granularity being configured for a plurality of control channels mapped in different time resources; and performing a reception processing on a signal of the plurality of control channels transmitted from the base station, based on the identified precoding granularity.

It should be noted that these general or specific aspects may be implemented as a system, an apparatus, a method, an integrated circuit, a computer program, a storage medium, or any selective combination thereof.

According to one example of the present disclosure, it is made possible to apply precoding to PDCCH appropriately.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 8 illustrates an exemplary association between an AL and a precoding granularity according to Embodiment 2;

FIG. 13 illustrates an exemplary association between the precoding granularity of a frequency domain and the precoding granularity of a time domain according to Embodiment 2; and FIG. 14 illustrates an exemplary association between the precoding granularity of the frequency domain and the precoding granularity of the time domain according to Embodiment 2.

DESCRIPTION OF EMBODIMENTS

Figure 1:
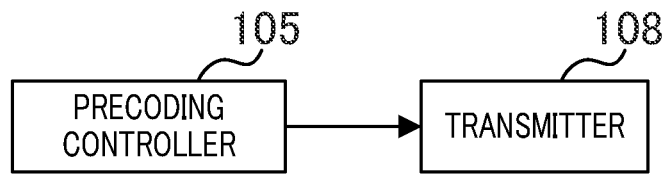
FIG. 1 is a block diagram illustrating a configuration of a part of a base station according to Embodiment 1.

Hereinafter, embodiments of the present disclosure will be described in detail with reference to the accompanying drawings.

[PDCCH Repetition Scheme]

In NR, as a method for enhancing the reliability of PDCCH, for example, a "PDCCH repetition", which improves reception performance by transmitting the same PDCCH repeatedly is studied in addition to precoding (see, e.g., NPL 3).

As the PDCCH repetition in NR, a time domain repetition and a frequency domain repetition are assumed.

The frequency domain repetition is a scheme for transmitting the same PDCCH repeatedly by using different frequency resources. The frequency domain repetition has an advantage of obtaining a frequency diversity effect. The frequency domain repetition also has an advantage in that no delay is increased since the PDCCHs for repetition transmission are transmitted simultaneously. On the other hand, the frequency domain repetition needs a large amount of frequency resources to transmit the PDCCH at the low encoding rate for improving reception performance.

The time domain repetition is a scheme for transmitting the same PDCCH repeatedly by using different time resources. The time domain repetition has an advantage of obtaining a time diversity effect, whereas a delay is increased.

Compared with the frequency domain repetition, the time domain repetition needs no wide bandwidth; thus it is effective, for example, in a case where a wide bandwidth is unavailable.

Moreover, NR supports a wide Subcarrier spacing (SCS), compared with LTE. When the bandwidth is identical, the wider the Subcarrier spacing is, the less the number of subcarriers is; thus it is difficult to secure the sufficient frequency resource. In contrast, a delay in transmission reduces, because the wider the Subcarrier spacing is, the shorter the length of symbol (e.g., Orthogonal Frequency Division Multiplexing (OFDM) symbol) is.

Thus, it is considered that the time domain repetition is more effective than the frequency domain repetition in NR. Hereinafter, "PDCCH repetition" refers to time domain repetition, unless otherwise noted.

[Precoding Granularity of PDCCH]

The term "precoding granularity" or "precoder granularity" refers to a domain (e.g., time domain or frequency domain) in which the same precoding is applied (used) to PDCCH.

The precoding granularity includes a precoding granularity of frequency domain and a precoding granularity of time domain.

A precoding granularity for a non-repeated PDCCH (e.g., referred to as "regular PDCCH") is defined, for example, as follows.

[Precoding Granularity of Frequency Domain]

One of the following two types of granularity units is applied as the precoding granularity of frequency domain.

(1) Resource Element Group (REG) Bundle Unit

The same precoding is applied (used) to the signal in REG bundle. Note that, the precoding granularity of the REG bundle unit may be referred to as "Narrowband RS" as a reference signal (RS) type, and also be expressed by "Same as REG bundle" as a parameter.

1 REG is defined, for example, as a radio resource of 1 OFDM symbol in the time frequency domain or 1 Physical Resource Block (PRB) in the frequency domain. REG bundle is defined as a radio resource that binds multiple REGs. By way of example, in NR, the REG bundle size (i.e., the number of REGs consisting the REG bundle) is any one of 2, 3, or 6. The REG bundle size is configured to a terminal, for example, by higher layer signaling (referred to as an "upper layer parameter") such as Radio Resource Control (RRC) signaling.

(2) Contiguous PRB Unit

The same precoding is applied (used) to the signal in the contiguous PRBs in Control resource Set (CORESET). Note that, the precoding granularity of the contiguous PRB unit may be referred to as "Wideband RS" as a reference signal (RS) type, and also be expressed by "All contiguous RBs" as a parameter.

CORESET is a radio resource to transmit a PDCCH, and, for example, is defined as a radio resource of 1 to 3 symbols in the time frequency domain or a radio resource of 6 or more PRBs in the frequency domain. The PRBs in the frequency domain may be either contiguous or non-contiguous.

When the precoding granularity of contiguous PRB unit is applied, the CORESET is divided into at most 4. The CORESET size of the time domain (e.g., the number of symbols) and the positions of PRBs to be used in the frequency domain are configured to a terminal, for example, by higher layer signaling (higher layer parameter) such as RRC signaling.

[Precoding Granularity in Time Domain]

In the time domain, the same precoding is applied (used) to the signal in the CORESET. Thus, the precoding granularity of the time domain is any one of 1 to 3 symbols, that is, the time resource of the CORESET.

The precoding granularity of PDCCH has been described above.

By way of example, since the PDCCH repetition in the time domain transmits PDCCHs repeatedly in the time domain, the precoding granularity in the time domain should be configured appropriately. Hereinafter, "precoding granularity" refers to the precoding granularity in the time domain, unless otherwise noted.

[Differences Between LTE and NR]

For example, LTE and NR differ from each other in the following points (1) to (3).

(1) Mapping and Density of DM-RSs

LTE uses Demodulation Reference Signal (DM-RS) in Enhanced Physical Downlink Control Channel (EPDCCH), MTC Physical Downlink Control Channel (MPDCCH), or Relay Physical Downlink Control Channel (RPDCCH).

In LTE, DM-RS is not included in all symbols; thus mapping and a density of DM-RSs are identical between the control channel and data channel. On the other hand, in NR, DM-RS is included in each symbol, and mapping or a density of DM-RSs differ each other between control channel and data channel.

(2) Precoding Granularity of PDCCH in Time Domain

In LTE, the precoding granularity is 1 PRB (e.g., 7 symbols, 0.5 ms). On the other hand, in NR, the precoding granularity is 1 to 3 symbols. Note that, in NR, time differs depending on the subcarrier spacing. In one example, when the subcarrier spacing is 15 kHz, 1 to 3 symbols are equivalent to approximately 71 to 214 μs.

(3) Precoding Granularity in Time Domain of PDCCH Repetition

LTE supports PDCCH repetition in MPDCCH. Since in LTE, the mapping and the density of DM-RSs are identical between control channel and data channel, the precoding granularity of PDCCH repetition in MPDCCH is equal to a frequency hopping cycle of PDSCH. The frequency hopping is a function to obtain the frequency diversity effect by hopping of the frequency resource for transmission at every predetermined period for Machine Type Communications (MTC).

By contrast, in NR, the precoding granularity of PDCCH repetition in time domain has not been fully discussed. In addition, in NR, the frequency hopping is not supported, and the mapping or the density of DM-RSs differ each other between control channel and data channel. Consequently, in NR, the same precoding granularity determination method as in LTE cannot be applied; therefore, it should be studied to configure the precoding granularity for the control channel in NR.

[Relation Between Precoding Granularity in Time Domain and Reception Performance]

Changing the precoding granularity in time domain causes a below-described trade-off relationship with reception performance.

[In Case of Coarsening Precoding Granularity]

When the precoding granularity is coarsened, in other words, the time domain (e.g., the number of symbols or the time) using the same precoding is large, the same precoding is readily applied in the PDCCHs to be repeated. This increases the number of DM-RSs usable in channel estimation at the reception side, and thus, channel estimation accuracy is enhanced by, in one example, IQ combining, which enables improvement of reception performance.

Meanwhile, in cases where, for example, time fluctuation of channel is intensive, or a distance between PDCCH symbols is large, IQ combining at the reception side under with the coarsened precoding granularity may cause deterioration of reception performance.

[In Case of Fining Precoding Granularity]

When the precoding granularity is fined, in other words, the time domain (e.g., the number of symbols or the time) using the same precoding is small, the different precoding is readily applied in the PDCCHs to be repeated. This enables improvement of reception performance by space diversity effect.

However, when a sufficient space diversity effect is obtained in one time PDCCH transmission (for example, when a sufficiently large number of pieces of precoding is used in PDCCH transmission), fining the precoding granularity has a small improvement effect of reception performance by space diversity effect. In this case, reception performance may be improved by enhancing channel estimation accuracy than obtaining space diversity effect by the precoding granularity.

Thus, the difference of the precoding granularity causes the trade-off relationship between channel estimation accuracy and space diversity effect. Consequently, the appropriate configuration for the precoding granularity of PDCCH differs depending on a reception environment of a terminal.

Hereinafter, a method for configuring the precoding granularity for the control channel of NR will be described.

Embodiment 1

[Overview of Communication System]

A communication system according to an embodiment of the present disclosure includes base station 100 (e.g., gNB) and terminal 200 (e.g., UE).

FIG. 1 is a block diagram illustrating a configuration of a part of base station 100 according to one example of the present disclosure. In base station 100 illustrated in FIG. 1, precoding controller 105 configures a precoding granularity indicating a period in which the same precoding is applied to each control channel (e.g., PDCCH) mapped in different time resources. Transmitter 108 transmits signals of the control channels to terminal 200.

Figure 2:
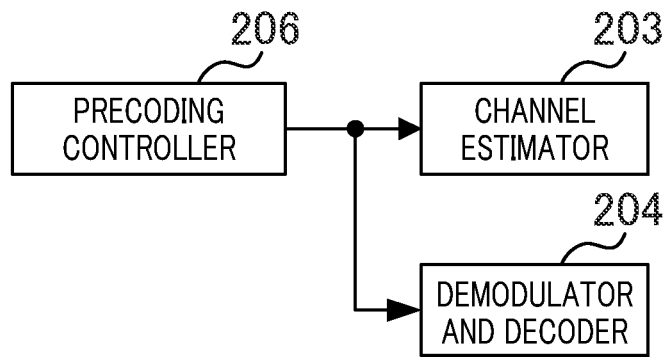
FIG. 2 is a block diagram illustrating a configuration of a part of a terminal according to Embodiment 1.

FIG. 2 is a block diagram illustrating a configuration of a part of terminal 200 according to one example of the present disclosure. In terminal 200 illustrated in FIG. 2, precoding controller 206 identifies a precoding granularity indicating a period in which the same precoding is applied to each control channel (e.g., PDCCH) mapped in different time resources. A reception processor corresponding to, for example, channel estimator 203 and demodulator and decoder 204 performs reception processing on signals of the control channels transmitted from base station 100 based on the specified precoding granularity.

[Configuration of Base Station]

Figure 3:
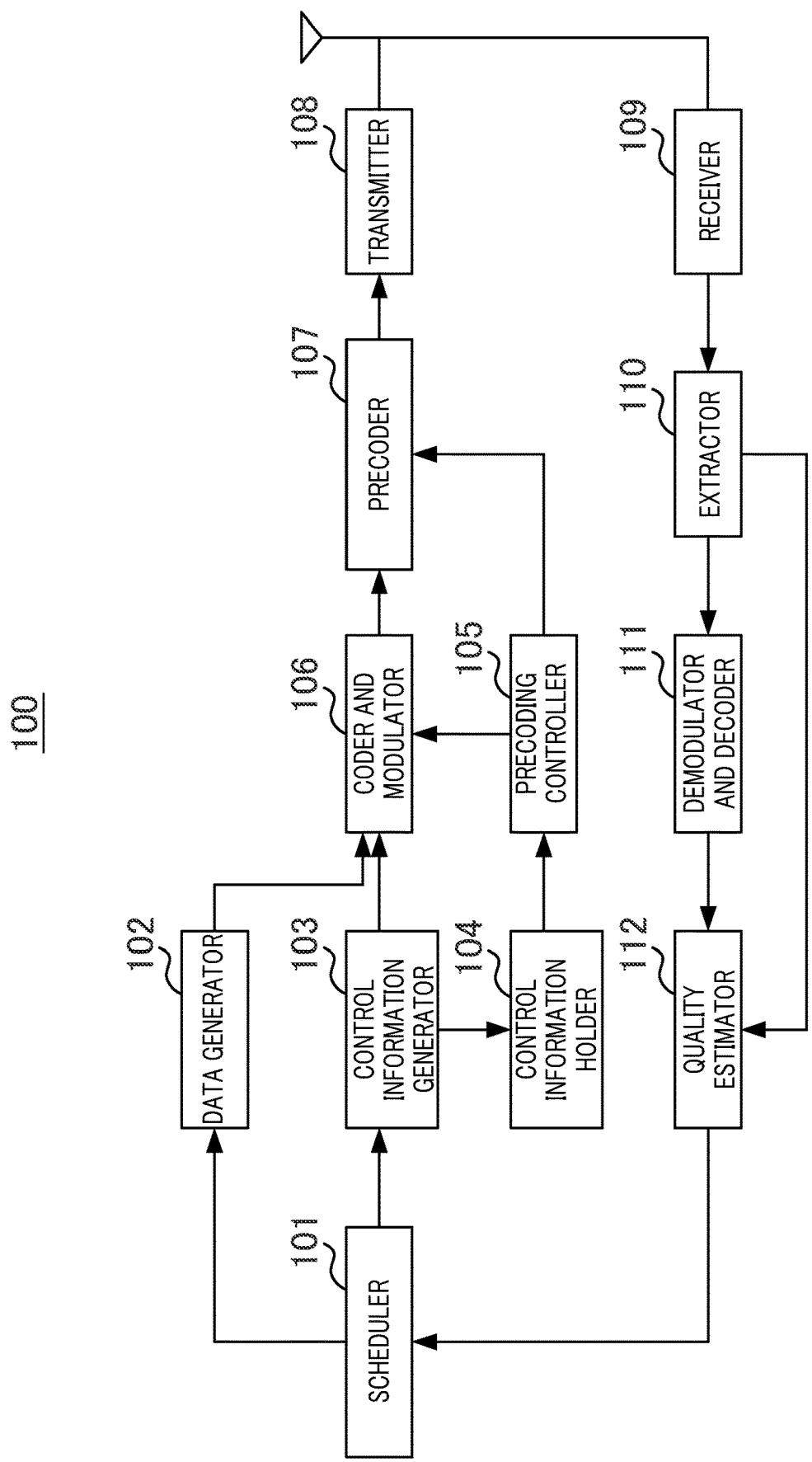
FIG. 3 is a block diagram illustrating a configuration of the base station according to Embodiment 1.

FIG. 3 is a block diagram illustrating a configuration of base station 100 according to the present embodiment. Base station 100 illustrated in FIG. 3 includes scheduler 101, data generator 102, control information generator 103, control information holder 104, precoding controller 105, coder and modulator 106, precoder 107, transmitter 108, receiver 109, extractor 110, demodulator and decoder 111, and quality estimator 112.

Scheduler 101 performs scheduling (e.g., determines frequency resource and transmission timing) for transmission of data or control information to terminal 200 based on the downlink channel state (or the channel quality) input from quality estimator 112. Scheduler 101 outputs scheduling information indicating the result of the scheduling (e.g., a result of resource allocation, repetition information, and/or the like) to control information generator 103. Also, scheduler 101 instructs data generator 102 to generate data.

Data generator 102 generates transmission data based on the instruction of scheduler 101, and outputs the generated transmission data to coder and modulator 106.

Control information generator 103 generates control information to configure a precoding granularity for the control channel (e.g., PDCCH) based on scheduling information input from scheduler 101, and outputs the generated control information to control information holder 104 and coder and modulator 106. Note that, control information may be indicated from base station 100 to terminal 200 by one or a combination of Downlink Control Information (DCI), Medium Access Control (MAC), or Radio Resource Control (RRC) signaling.

Repetitions may be applied to transmission data (downlink data) and control information (downlink control information). The repetitions of downlink data and the repetitions of downlink control information are controlled respectively.

Control information holder 104 holds control information input from control information generator 103, and outputs the held control information to precoding controller 105 when necessary.

Precoding controller 105 configures the precoding granularity for the control channel (e.g., PDCCH) based on the control information input from control information holder 104, and outputs granularity information indicating the configured precoding granularity for coder and modulator 106 and precoder 107. Note that, precoding controller 105 configures precoding granularities to the data channel and the control channel, respectively.

Coder and modulator 106 encodes transmission data input from data generator 102 or control information input from control information generator 103, modulates the signal after encoding, and outputs the modulated signal (symbol sequence) to precoder 107. Also, coder and modulator 106 encodes granularity data input from precoding controller 105, modulates signal after encoding, and outputs the modulated signal to precoder 107.

Precoder 107 applies precoding to the signal input from coder and modulator 106 (e.g., the signals of the data channel or the signals of the control channel) or to the demodulation reference signal (DM-RS not illustrated) based on the precoding granularity which is indicated in granularity information input from precoding controller 105. Precoder 107 outputs the signal applied precoding to transmitter 108.

Transmitter 108 performs transmission processing such as D/A conversion, up-conversion, or amplification on the signal input from precoder 107 or on the reference signal (e.g., Channel State Information Reference Signal (CSI-RS), not illustrated), and transmits the radio signal obtained by transmission processing from the antenna to terminal 200.

Receiver 109 receives the signal transmitted from terminal 200 through the antenna, performs reception processing such as down-conversion or A/D conversion on the received signal, and outputs the received signal obtained by reception processing to extractor 110.

Extractor 110 extracts data or control information from the received signal input from receiver 109, and outputs the extracted signal to demodulator and decoder 111. Extractor 110 also extracts a reference signal (e.g., Sounding Reference Signal (SRS)) from the received signal, and outputs the extracted reference signal to quality estimator 112.

Demodulator and decoder 111 demodulates and decodes the control information input from extractor 110, and outputs feedback information included in the decoded control information to quality estimator 112. Demodulator and decoder 111 also demodulates and decodes on data input from extractor 110, and outputs the decoded data to another configuration part (not illustrated).

Quality estimator 112 estimates a downlink channel state (reception quality or moving speed of terminal 200, for example) based on the SRS input from extractor 110 and feedback information input from demodulator and decoder 111, and outputs information indicating the estimated channel state to scheduler 101.

[Configuration of Terminal]

Figure 4:
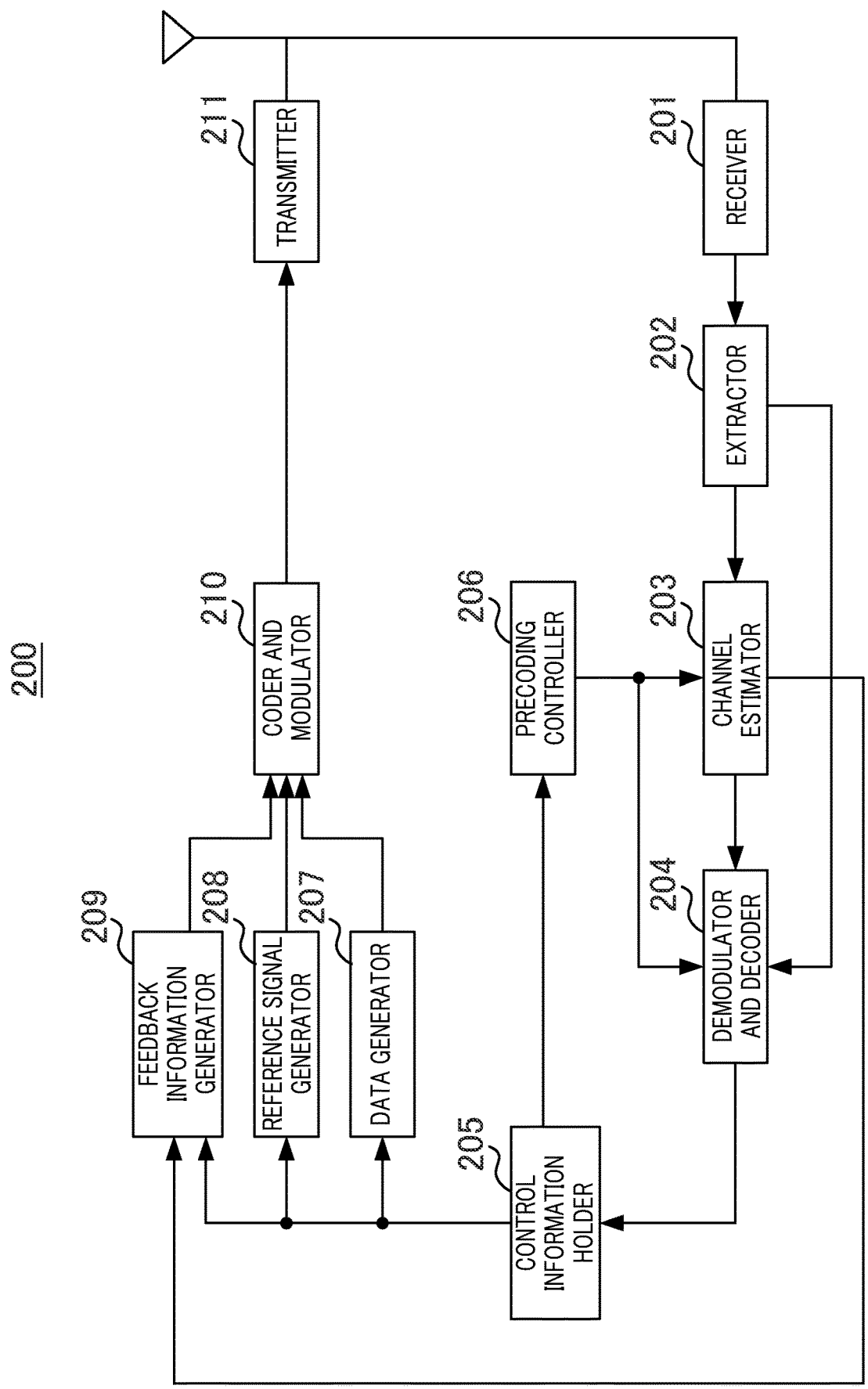
FIG. 4 is a block diagram illustrating a configuration of the terminal according to Embodiment 1.

FIG. 4 is a block diagram illustrating a configuration of terminal 200 according to the present embodiment. In FIG. 4, terminal 200 includes receiver 201, extractor 202, channel estimator 203, demodulator and decoder 204, control information holder 205, precoding controller 206, data generator 207, reference signal generator 208, feedback information generator 209, coder and modulator 210, and transmitter 211.

Receiver 201 performs reception processing such as down-conversion or A/D conversion on a received signal through the antenna, and outputs the received signal to extractor 202.

Extractor 202 extracts data, control information, or a reference signal (e.g., DM-RS or CSI-RS) from the received signal input from receiver 201. Extractor 202 outputs the extracted data or control information to channel estimator 203 and demodulator and decoder 204, and outputs the extracted reference signal to channel estimator 203.

Channel estimator 203 performs channel estimation based on the data, or the control information, and/or the reference signal input from extractor 202, and the precoding granularity input from precoding controller 206, and outputs the estimated channel information to demodulator and decoder 204 and feedback information generator 209. In one example, channel estimator 203, according to the precoding granularity indicated in granularity information, performs, for example, IQ combining between symbols in the periods in which the same precoding is applied, and performs channel estimation on the IQ combined signal. This allows reduction the number of channel estimations. Note that, channel estimator 203 performs channel estimation on data and control information, individually.

Demodulator and decoder 204 demodulates and decodes data or control information input from extractor 202, using channel information input from channel estimator 203 and granularity information input from precoding controller 206. In one example, demodulator and decoder 204, according to the precoding granularity indicated in granularity information, for example, combines soft decision values of PDCCH between symbols in the periods in which the same precoding is applied, and decodes the combined signal of PDCCH. This allows reduction in decoding processes or times of decoding PDCCH). Demodulator and decoder 204 outputs the decoded data to another configuration part (not illustrated). Also, demodulator and decoder 204 outputs the decoded control information (e.g., control information to identify the precoding granularity, the precoding granularity, or scheduling information) to control information holder 205.

Control information holder 205 holds control information input from demodulator and decoder 204, and outputs the held control information to precoding controller 206, data generator 207, reference signal generator 208, or feedback information generator 209 when necessary. The control information held in control information holder 205 includes, for example, quasi-static or dyna mic control information.

Precoding controller 206 identifies (estimates) the precoding granularity configured to the data channel (e.g., PDSCH) or the control channel (e.g., PDCCH) based on control information input from control information holder 205. Also, precoding controller 206 outputs granularity information indicating the specified precoding granularity for channel estimator 203 and demodulator and decoder 204.

Data generator 207 generates transmission data based on the control information input from control information holder 205, and outputs the generated transmission data to coder and modulator 210. Note that, a repetition of uplink data is defined in uplink, and a repetition of uplink data may be controlled separately from a repetition of downlink data and a repetition of downlink control information.

Reference signal generator 208 generates a reference signal (e.g., SRS) based on the control information input from control information holder 205, and outputs the reference signal to coder and modulator 210.

Feedback information generator 209 generates feedback information including, for example, downlink channel information based on the channel information input from channel estimator 203 and the control information input from control information holder 205, and outputs the generated feedback information to coder and modulator 210.

Coder and modulator 210 performs encoding and modulation processing according to an input signal. For example, coder and modulator 210 encodes and modulates data input from data generator 207 to suit for data. In addition, coder and modulator 210 codes and modulates feedback information input from feedback information generator 209 to suit for control information. Also, coder and modulator 210 converts the reference signal input from reference signal generator 208 into a time domain signal. Coder and modulator 210 outputs the generated transmission signal to transmitter 211.

Transmitter 211 performs transmission processing such as D/A conversion, up-conversion, or amplification on the signal input from coder and modulator 210, and transmits the radio signal obtained by transmission processing from the antenna to the terminal.

[Operations of Base Station 100 and Terminal 200]

Operations of base station 100 and terminal 200 having the above configurations will be described in detail.

Figure 5:
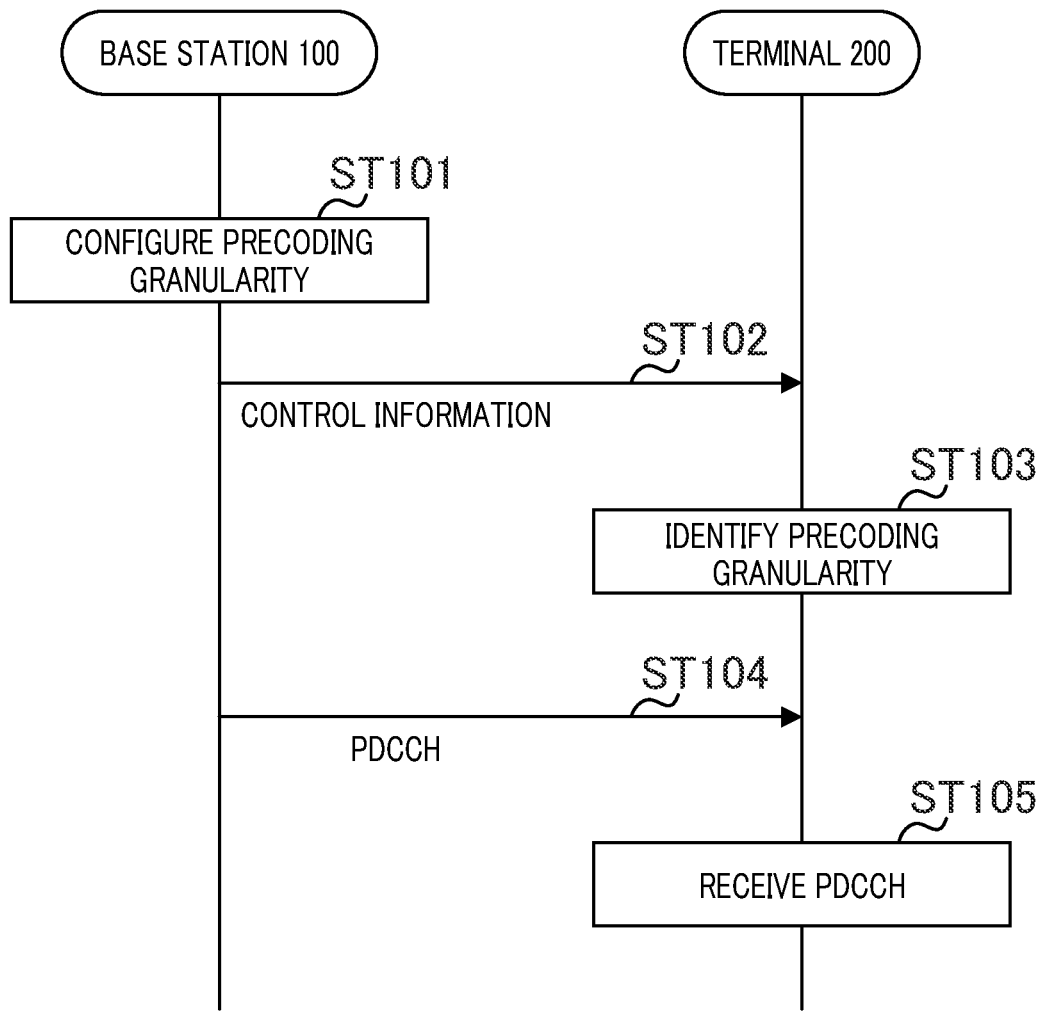
FIG. 5 is a sequence diagram illustrating exemplary operations of the base station and the terminal according to Embodiment 1.

FIG. 5 is a sequence diagram illustrating operations of base station 100 and terminal 200.

Base station 100, for example, based on the reception environment of terminal 200 (e.g., channel state or moving speed), configures the precoding granularity for the PDCCH to terminal 200 (ST101). Base station 100 indicates control information including granularity information indicating the configured precoding granularity in ST101 to terminal 200 (ST102). In the indication of granularity information, by way of example, RRC, MAC, or DCI signaling may be used for the indication of granularity information.

Terminal 200 specifies the precoding granularity configured for the PDCCH based on control information indicated by base station 100 (ST103).

Base station 100 transmits the PDCCH (e.g., a plurality of repeated PDCCHs) to terminal 200 based on the precoding granularity configured in ST101 (ST104). Terminal 200 receives (e.g., performs channel estimation, and demodulation and decoding) the PDCCH to be transmitted from base station 100, based on the precoding granularity specified in ST103 (ST105).

Next, a method for determining the precoding granularity in base station 100 (e.g., precoding controller 105) or terminal 200 (e.g., precoding controller 206) will be described in detail.

In the present embodiment, base station 100 configures the precoding granularity for PDCCH, includes granularity information indicating the configured precoding granularity in control information as, for example, signaling information of any one of DCI, MAC, or RRC, and explicitly indicates the granularity information to terminal 200. Terminal 200 identifies the precoding granularity for PDCCH based on granularity information explicitly indicated from base station 100.

Base station 100, for example, configures the precoding granularity for each terminal 200 or each CORESET. The precoding granularity may be either different or identical between terminals 200 or between CORESETs.

Besides, the precoding granularity (i.e., the period in which the same precoding is used) may be expressed by the number of symbols or the time (absolute time; e.g., ms).

Base station and Terminal 200 apply the same precoding to the PDCCH, which is included in the period (e.g., the number of symbols or the time) to be configured as the precoding granularity starting from a predetermined slot or a symbol. Note that, a predetermined slot or symbol that is a start point of the period to be configured as the precoding granularity may be determined according to, for example, the following example 1 or example 2.

Example 1

A predetermined slot or a symbol as a start point is a slot or symbol (referred to as, for example, "monitoring occasion"), in which terminal 200 monitors PDCCH firstly within a specified time. Note that, the slot or the symbol, in which terminal 200 performs monitoring may be configured by, for example, base station 100.

Example 2

A predetermined slot or symbol serving as a start point is a fixed slot or a symbol. The fixed slot or the symbol may be, for example, System Frame Number (SFN) 0, slot number 0, or symbol number 0.

The examples of the predetermined slot or symbol serving as a start point of the period to be configured as the precoding granularity have been described above.

Figure 6A:
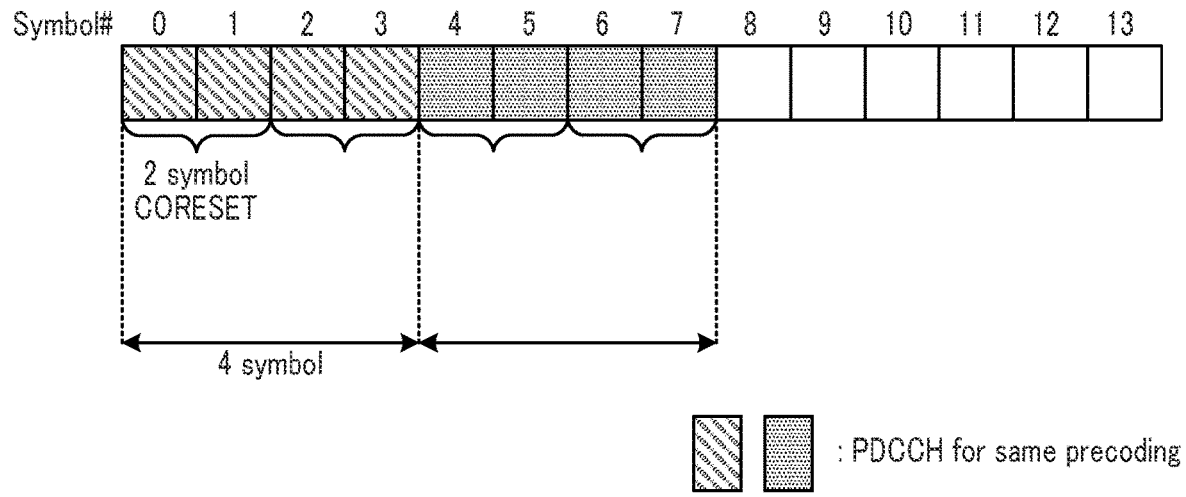
FIG. 6A illustrates an exemplary configuration of a precoding granularity according to Embodiment 1.
Figure 6B:
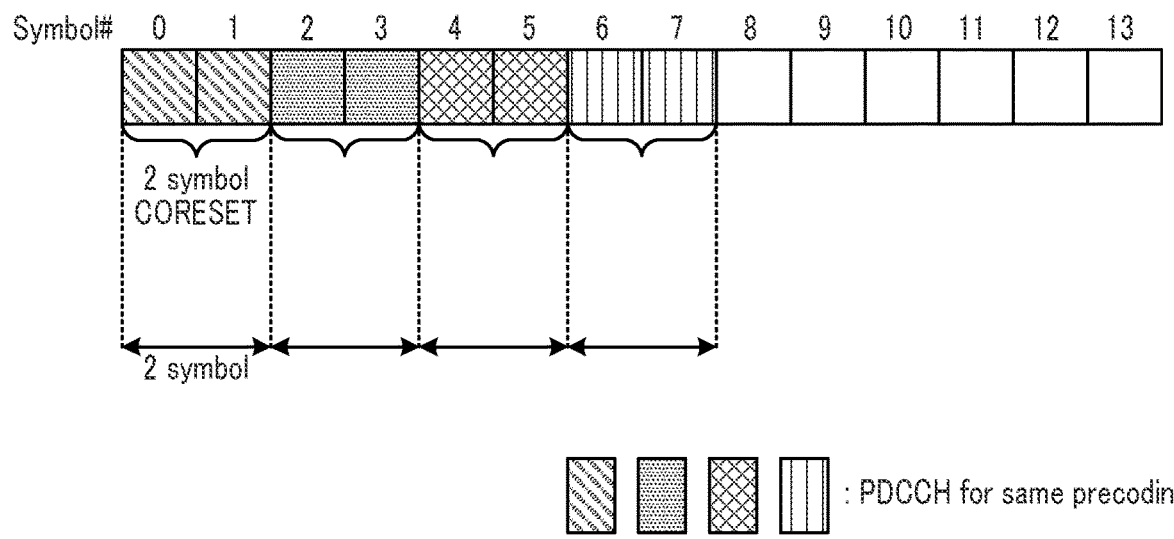
FIG. 6B illustrates an exemplary configuration of the precoding granularity according to Embodiment 1.

FIGS. 6A and 6B illustrate a configuration example of a precoding granularity of PDCCH.

In FIGS. 6A and 6B, by way of example, the number of CORESET symbols is configured to 2 symbols, and the number of PDCCH repetition is configured to 4 symbols. In other words, base station 100 transmits a PDCCH using 8 symbols in total.

In addition, FIG. 6A illustrates a case where a precoding granularity is configured to 4 symbols, while in FIG. 6B a precoding granularity is configured to 2 symbols. That is, in comparison between FIGS. 6A and 6B, the precoding granularity is coarse in FIG. 6A, and fine in FIG. 6B.

In particular, in FIG. 6A (the precoding granularity: 4 symbols), out of the 8 symbols (symbols #0 to #7 in FIG. 6A) for PDCCH transmission, the precoding to be applied is different between the first 4 symbols (symbols #0 to #3) and the last 4 symbols (symbols #4 to #7). In other words, in FIG. 6A, out of the 8 symbols for PDCCH transmission, the same precoding is applied to the first 4 symbols, and the other same precoding is applied to the back 4 symbols.

On the other hand, in FIG. 6B (the precoding granularity: 2 symbols), out of the 8 symbols (symbols #0 to #7 in FIG. 6B) for PDCCH transmission, the different precoding is applied to every 2 symbols. In other words, in FIG. 6B, out of the 8 symbols for PDCCH transmission, the same precoding is applied to each 2 symbols.

As described above, improvement effect of channel estimation accuracy or space diversity effect can be obtained depending on the precoding granularity. Base station 100 determines which of the improvement effect of channel estimation accuracy or space diversity effect has priority, and configures the precoding granularity based on, for example, a reception environment of terminal 200.

Base station 100 determines the precoding granularity of PDCCH based on, for example, static or dynamic control information or the information estimated in base station 100 (e.g., the channel information between base station 100 and terminal 200 or the moving speed of terminal 200).

By way of example, in radio resource allocated in terminal 200, when a sufficiently large number of pieces of precoding is used in one time PDCCH transmission (in other words, when a sufficient space diversity effect is obtained in PDCCH transmission), applying precoding has small improvement effect of reception performance by the space diversity effect. Then, base station 100 configures the coarse precoding granularity as illustrated in FIG. 6A for terminal 200 to give priority to improvement effect of channel estimation accuracy over space diversity effect. This enables improvement of reception performance in terminal 200 by the enhancement of channel estimation accuracy.

Meanwhile, for example, in terminal 200 having a high moving speed, time fluctuation of channel is intensive; thus applying the same precoding between the PDCCHs to be repeated may cause deterioration of reception performance by IQ combining. Then, base station 100 configures the fine precoding granularity as illustrated in FIG. 6B for terminal 200 to give priority to space diversity effect over improvement effect of channel estimation accuracy. As a result, different precoding can be easily applied between the PDCCHs to be repeated, and this enables improvement of reception performance in terminal 200 by space diversity effect.

The method for determining the precoding granularity according to the present embodiment has been described above.

As described above, in the present embodiment, base station 100 configures the precoding granularity for a plurality of PDCCHs (e.g., PDCCH to be repeated) mapped to different time resources (e.g., symbol), and transmits the PDCCHs to terminal 200 based on the configured precoding granularity. On the other hand, terminal 200 identifies the precoding granularity of the PDCCHs configured by base station 100 receives the PDCCHs to be transmitted from base station 100 based on the specified precoding granularity.

In one example, base station 100 determines which of the improvement effect of channel estimation accuracy or space diversity effect has priority, and configures the precoding granularity. This enables improvement of reception performance by precoding of PDCCH.

Therefore, according to the present embodiment, the precoding can be appropriately applied to the PDCCH.

Note that, in the present embodiment, a candidate value of the precoding granularity to be configured for PDCCH is not limited to either of two types of granularities (e.g., 4 symbols or 2 symbols) illustrated in FIGS. 6A and 6B, and may be configured out of any one of three or more types of granularities.

Figure 7:
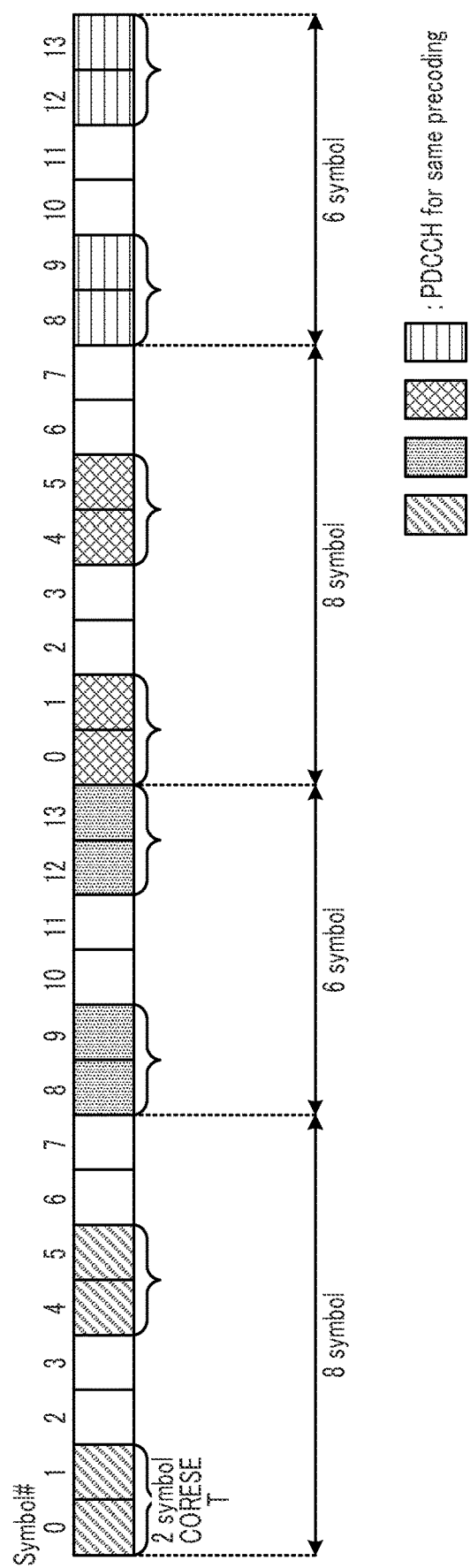
FIG. 7 illustrates another exemplary configuration of the precoding granularity according to Embodiment 1.

Furthermore, in the present embodiment, the precoding granularity to be configured at one time for terminal 200 is not limited to one type of granularities as illustrated in FIGS. 6A and 6B, and a combination of a plurality of precoding granularities may be configured for terminal 200. For example, FIG. 7 illustrates a configuration example, in which two types of the precoding granularities are configured for the PDCCH to terminal 200. Note that, the number of precoding granularities to be configured for the PDCCH to terminal 200 is not limited to two, and the number of precoding granularities may be three or more. In FIG. 7, a combination of two types of the precoding granularities (8 symbols and 6 symbols) are configured to terminal 200. As a result, for example, as illustrated in FIG. 7, the precoding boundary and the slot boundary can be aligned, which enables the flexible configuration.

Besides, the same precoding granularity may be shared by a plurality of terminals 200. In this case, for example, the same recognition of a slot or a symbol that is a start point of the precoding granularity may be shared by the plurality of terminal 200. This allows the plurality of terminal 200 to have common symbols to which the same precoding is applied. As a result, for channel estimation, terminal 200 can use the DM-RS transmitted to the other terminal, which enables enhancement of channel estimation accuracy.

In addition, the precoding granularity may be configured to be finer than the number of symbols in a CORESET. In other words, different precoding may be applied between the symbols in CORESET. For example, in a case where time fluctuation of the channel is intensive, and prioritizing space diversity effect is more effective than applying the same precoding between the symbols in CORESET, base station 100 configures the precoding granularity to be finer than the number of symbols in a CORESET. This enables improvement of reception performance of PDCCH in the symbols in CORESET in terminal 200.

In addition, the precoding granularity may be configured to be identical to the period of the PDCCH repetition. In this case, terminal 200 can in one step perform channel estimation for the plurality of repeatedly transmitted PDCCHs and the signal combined by IQ combination, instead of performing channel estimation on the plurality of repeatedly transmitted PDCCHs, respectively. Similarly, in decoding processing, terminal 200 can decode a plurality of PDCCHs in one step by, in one example, combination of soft decision values. This enables reduction of the number of channel estimation and the number of decoding.

Note that, base station 100 may configure a different number of repetitions, a different repetition pattern, or a different precoding granularity from PDCCH to PDSCH. PDSCH may have a different coding rate, different target Blok Error Rate (BLER), and different frequency or time resource to be used from PDCCH. Thus, configuring the number of repetitions and the repetition pattern individually at PDSCH and PDCCH realizes the repetition satisfying the performance requirement of each channel and having reduced consumption of radio resource. Furthermore, between PDSCH and PDCCH the density of the DM-RSs is different and the required precoding granularity to enhance channel estimation accuracy is also different. Thus, configuring the precoding granularity at PDSCH and PDCCH realizes the precoding enhancing channel estimation accuracy and obtaining space diversity effect.

Embodiment 2

In Embodiment 1, a case where granularity information indicating the precoding granularity of PDCCH is indicated explicitly from base station 100 to terminal 200 has been described. In the present embodiment, a case where granularity information indicating the precoding granularity of PDCCH is implicitly indicated from base station 100 to terminal 200 will be described.

Since the configurations of the base station and the terminal according to the present embodiment has the same basic configuration as base station 100 and terminal 200 according to Embodiment 1, the description will be given using FIGS. 3 and 4.

In the present embodiment, base station 100 (e.g., precoding controller 105) and terminal 200 (e.g., precoding controller 206) share the predetermined rule that uniquely associates the precoding granularity of PDCCH and other parameters (configuring information or control information) configured (i.e., indicated) to terminal 200 other than the precoding granularity.

Base station 100, for example, indicates control information including a parameter, which is associated with the precoding granularity configured for terminal 200. Terminal 200 identifies the precoding granularity, which is associated with the parameter included in control information transmitted from base station 100. In other words, the precoding granularity is implicitly indicated to terminal 200 by indicating control information from base station 100 to terminal 200. In the present embodiment, base station 100 does not indicate explicitly control information indicating the precoding granularity of PDCCH to terminal 200.

Therefore, according to the present embodiment, since explicit indication of information indicating the precoding granularity is unnecessary, an amount of signaling to indicate control information from base station 100 to terminal 200 can be reduced.

Hereinafter, configuration examples of the rules that associate precoding granularity of PDCCH with parameters will be described.

Configuration Example 1-1

In Configuration Example 1-1, precoding granularity is uniquely associated with Aggregation Level (AL) of PDCCH.

In NR, base station 100 adjusts a code rate of PDCCH by controlling the amount of radio resource for terminal 200 using the AL. For example, in Release 15, the ALs of 1, 2, 4, 8, 16 Control Channel Elements (CCEs) are selectable. Note that, 1 CCE is defined as 6 REGs.

When the AL is high, a large amount of radio resource is required; thus base station 100 transmits PDCCH using a large number of REG bundles.

When the precoding granularity in the frequency domain is in units of REG bundles, the different precoding can be applied to the different REG bundles. For this reason, when the number of REG bundles is large, different precoding is applied in the frequency domain, which enhances space diversity effect.

Accordingly, in a case where the number of REG bundles is sufficiently large to obtain the sufficient space diversity effect by precoding in the frequency domain, in the time domain, reception performance can be improved by enhancing channel estimation accuracy using the same precoding than obtaining space diversity effect using the different precoding.

Then, in Configuration Example 1-1, the precoding granularity is configured to be coarse when the AL is high, and configured to be fine when the AL is low.

For example, as illustrated in FIG. 8, when the AL is less than 8 CCEs, terminal 200 configures the precoding granularity of PDCCH as 7 symbols, while configuring the precoding granularity of PDCCH as 14 symbols when AL is more than 8 CCEs.

Thus, in Configuration Example 1-1, the coarse precoding granularity is configured in the time domain when the AL is high. As a result, the same precoding can be easily applied between the PDCCHs to be repeated when a sufficient space diversity effect can be obtained in the frequency domain, and this enhances preferentially channel estimation accuracy by precoding, which enables improvement of reception performance of PDCCH.

On the other hand, in Configuration Example 1-1, the fine precoding granularity is configured in the time domain when the AL is low. As a result, the different precoding can be easily applied between the PDCCHs to be repeated even when a sufficient space diversity effect cannot be obtained in the frequency domain, and this causes space diversity effect, which enables improvement of reception performance of PDCCH.

Configuration Example 1-2

In Configuration Example 1-2, precoding granularity is uniquely associated with REG bundle size in CORESET.

Figures 9, 10:
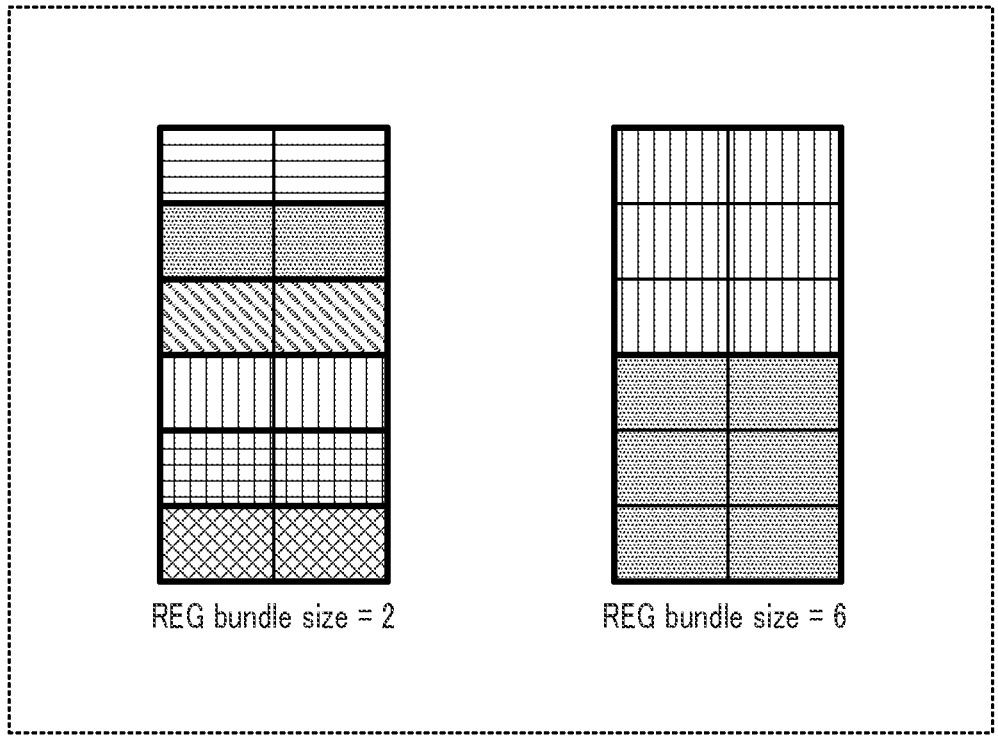
FIG. 9 illustrates an exemplary relation between a REG bundle size and the number of REG bundles.
FIG. 10 illustrates an exemplary association between a REG bundle size and the precoding granularity according to Embodiment 2.

When the CORESETs have the same number of REGs, the smaller the REG bundle size is, the larger the number of REG bundles is. In one example, FIG. 9 illustrates an example of difference of the number of REG bundles depending on the REG bundle size. In FIG. 9, the CORESET is configured by 6 PRBs in the frequency domain and 2 symbols in the time domain. Thus, the number of REGs is 12 REGs. As illustrated in FIG. 9, the number of the REG bundles is 6 when the REG bundle size is 2 (see the left side of FIG. 9), while the number of the REG bundles is 2 when the REG bundle size is 6 (see the right side of FIG. 9).

As described in Configuration Example 1-1, the larger the number of REG bundles is, the higher the space diversity effect by applying the different precoding in the frequency domain is.

Then, in Configuration Example 1-2, the precoding granularity is configured to be coarse when the REG bundle size is small, and configured to be fine when the REG bundle size is large.

For example, as illustrated in FIG. 10, when the REG bundle size is 2 or 3 REGs, terminal 200 configures the precoding granularity of PDCCH as 14 symbols, while configuring the precoding granularity of PDCCH as 7 symbols when REG bundle size is 6 REGs.

Thus, in Configuration Example 1-2, the coarse precoding granularity is configured in the time domain when the REG bundle size is small. As a result, the same precoding can be easily applied between the PDCCHs to be repeated when a sufficient space diversity effect can be obtained in the frequency domain, and this enhances preferentially channel estimation accuracy by precoding, which enables improvement of reception performance of PDCCH.

On the other hand, in Configuration Example 1-2, the fine precoding granularity is configured in the time domain when the REG bundle size is large. As a result, the different precoding can be easily applied between the PDCCHs to be repeated even when a sufficient space diversity effect cannot be obtained in the frequency domain, and this causes space diversity effect, which enables improvement of reception performance of PDCCH.

Configuration Example 1-3

In Configuration Example 1-3, precoding granularity is uniquely associated with the number of symbols in a CORESET.

Figures 11, 12:
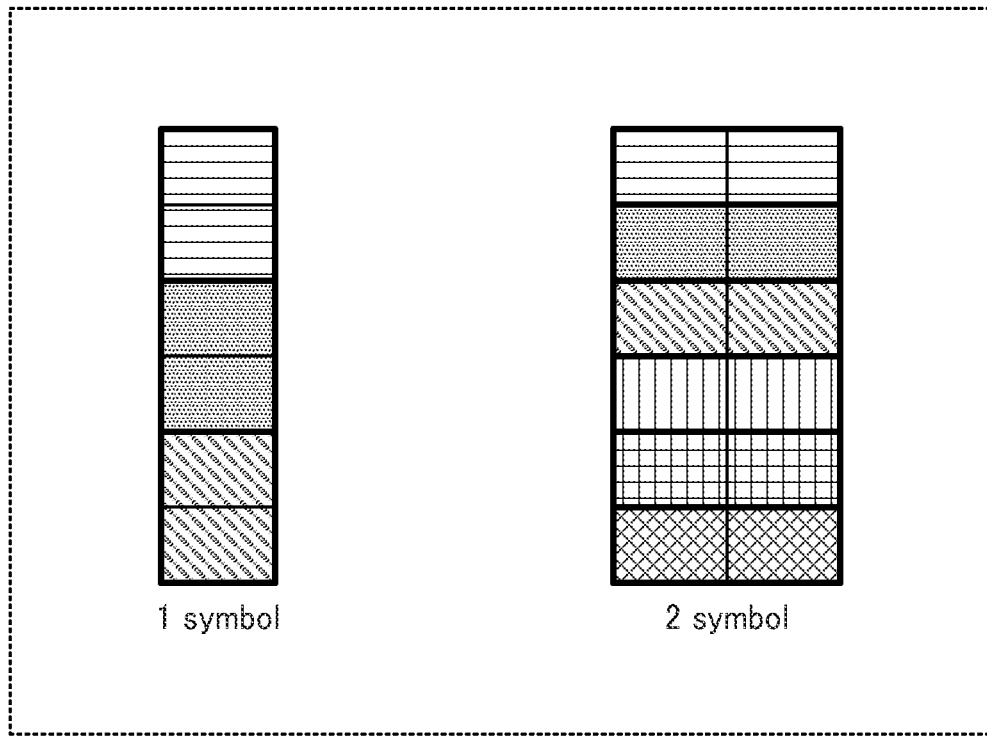
FIG. 11 illustrates an exemplary relation between the number of symbols in a CORESET and the number of REG bundles.
FIG. 12 illustrates an exemplary association between the number of symbols in a CORESET and the precoding granularity according to Embodiment 2.

When the CORESETs have the same REG bundle size, the lager the number of symbols in a CORESET is, the larger the number of REG bundles is. In one example, FIG. 11 illustrates an example of difference of the number of REG bundles depending on the number of symbols in a CORESET. In FIG. 11, the CORESET is configured by 6 PRBs in the frequency domain and 1 or 2 symbols in the time domain. Also, REG bundle size is 2 symbols. Thus, the number of REGs is 12 REGs. As illustrated in FIG. 11, the number of the REG bundles is 3 when the number of symbols in a CORESET is 1 symbol (see the left side of FIG.

11), while the number of the REG bundles is 6 when the number of symbols in a CORESET is 2 symbols (see the right side of FIG. 11).

As described in Configuration Example 1-1, the larger the number of REG bundles is, the higher the space diversity effect by applying the different precoding in the frequency domain is.

Then, in Configuration Example 1-3, the precoding granularity is configured to be fine when the number of symbols in a CORESET is small, and configured to be coarse when the number of symbols in a CORESET is large.

For example, as illustrated in FIG. 12, terminal 200 configures the precoding granularity of PDCCH as 4 symbols when the number of symbols in a CORESET is 1 symbol, configures the precoding granularity of PDCCH as 7 symbols when the number of symbols in a CORESET is 2 symbols, and configures the precoding granularity of PDCCH as 14 symbols when the number of symbols in a CORESET is 3 symbols.

Thus, in Configuration Example 1-3, the coarse precoding granularity is configured in the time domain when the number of symbols in a CORESET is small. As a result, the same precoding can be easily applied between the PDCCHs to be repeated when sufficient space diversity effect can be obtained in the frequency domain, and this enhances preferentially channel estimation accuracy by precoding, which enables improvement of reception performance of PDCCH.

On the other hand, in Configuration Example 1-3, the fine precoding granularity is configured in the time domain when the number of symbols in a CORESET is large. As a result, the different precoding can be easily applied between the PDCCHs to be repeated even when sufficient space diversity effect cannot be obtained in the frequency domain, and this causes space diversity effect, which enables improvement of reception performance of PDCCH.

Configuration Example 2-1

In Configuration Example 2-1, the precoding granularity in frequency domain and the precoding granularity in time domain are uniquely associated with each other.

In one example, when the precoding granularity in the frequency domain is in the above-described "units of contiguous PRBs" (i.e., "ALL contiguous RBs"), the maximum value of divisions of one CORESET is 4. Thus, when the granularity is "in units of contiguous PRBs", up to 4 precoding can be applied.

Thus, when the precoding granularity in the frequency domain is in "units of contiguous PRBs", a sufficient space diversity effect may not be obtained. In contrast, when the precoding granularity in the frequency domain is in "units of contiguous PRBs", the same precoding can be easily applied in the frequency domain, which enables obtaining a sufficient channel estimation accuracy.

Then, in Configuration Example 2-1, the fine precoding granularity is configured in the time domain when the precoding granularity in the frequency domain is in "contiguous PRB unit". As a result, the different precoding can be easily applied in the time domain, and this causes space diversity effect, which enables improvement of reception performance of PDCCH.

For example, as illustrated in FIG. 13, terminal 200 configures the precoding granularity in the time domain as 14 symbols when the precoding granularity in the frequency domain is in "units of REG bundles" ("Same as REG bundle"), configures the precoding granularity in the time domain as 7 symbols when the precoding granularity in the frequency domain is in "units of contiguous PRBs" ("All contiguous RBs").

Thus, in Configuration Example 2-1, the fine precoding granularity is configured in the time domain when a sufficient space diversity effect cannot be obtained in the frequency domain. As a result, the different precoding can be easily applied, for example, between the PDCCHs to be repeated, and space diversity effect can be obtained, which enables improvement of reception performance of PDCCH. In other words, in Configuration Example 2-1, when a sufficient channel estimation accuracy can be obtained in the frequency domain, the fine precoding granularity is configured in the time domain, and this allows preferentially obtaining space diversity effect than improvement effect of channel estimation accuracy.

On the other hand, in a case where the different precoding is sufficiently applied to obtain a sufficient space diversity effect in the frequency domain, the coarse precoding granularity is configured in the time domain. As a result, the same precoding can be easily applied, for example, between the PDCCHs to be repeated, and channel estimation accuracy can be preferentially improved, which enables improvement of reception performance of PDCCH Configuration examples of the rules that associate precoding granularity of PDCCH with parameters have been described.

Thus, in the present embodiment, the precoding granularity of PDCCH is associated with another parameter indicated from base station 100 to terminal 200, and implicitly indicated from base station 100 to terminal 200 by indication of another parameter.

Therefore, according to the present embodiment, since explicit indication for the precoding granularity of PDCCH is unnecessary, an amount of signaling can be reduced.

Note that, in FIG. 13, the case where the precoding granularity in the time domain is configured to be fine when the precoding granularity in the frequency domain is in "units of contiguous PRBs". However, in the case where further enhancing channel estimation accuracy is effective for improving reception performance even when the precoding granularity in the frequency domain is in "units of contiguous PRBs", the precoding granularity in the time domain may be configured, as illustrated in FIG. 14.

In particular, as illustrated in FIG. 14, when the precoding granularity in the frequency domain is in "units of REG bundles", the precoding granularity in the time domain is configured as 7 symbols, and when the precoding granularity in the frequency domain is in "units of contiguous PRBs", the precoding granularity in the time domain is configured as 14 symbols. Thus, when the precoding granularity in the frequency domain is in "units of contiguous PRBs", the coarse precoding granularity is configured in the time domain. This enhances channel estimation accuracy by applying the same precoding in the frequency domain and the time domain, which enables reception performance improvement.

It should be noted that, in the present embodiment, the rules that associate the precoding granularity with other parameters (configuring information or control information) may be configured as any selective combination of the above configuration examples. In one example, the precoding granularity may be associated with a combination of REG bundle size and the number of symbols in a CORESET.

Embodiments of the present disclosure have been described above.

Note that, in the above embodiments, the precoding granularity in the time domain (e.g., the number of symbols or the time) may be larger (coarser) than the slot length.

In addition, the symbol length differs depending on sub-carrier spacing; thus, in the above embodiments, when the precoding granularity in the time domain is configured as the number of symbols, the number of symbols to be applied as the precoding granularity in the time domain may be changed depending on subcarrier spacing.

Furthermore, for example, when the precoding granularity is not indicated explicitly from base station 100 to terminal 200 in Embodiment 1, or when the parameter (the parameter which is associated with the precoding granularity) to determine the precoding granularity is not indicated or indicated insufficiently in Embodiment 2, terminal 200 may apply a predetermined precoding granularity (default value). Thus, for example, the recognition of the precoding granularity can be shared by base station 100 and terminal 200, even in the case where signaling is insufficient, such as in initial access.

Moreover, in the above embodiments, the precoding granularity in the time domain may be determined depending on the restriction of the number of times of blind decoding of PDCCH or the restriction of the number of CCEs for performing channel estimation. For example, when the same precoding is applied to the repeated PDCCHs, terminal 200 performs, in one example, IQ combination in a plurality of PDCCHs. As a result, terminal 200 can perform channel estimation for the plurality of PDCCHs collectively in one step, instead of performing channel estimation at each reception timing of the plurality of PDCCHs, which enables terminal 200 to reduce the number of times of channel estimation. In addition, terminal 200 can reduce the number of times of decoding by performing decoding processing on the plurality of PDCCHs in one step. Thus, the precoding granularity in the time domain may be configured to be coarse for the purpose of reducing or in order to reduce the number of times of blind decoding of PDCCH or the number of CCEs for performing channel estimation. By way of example, base station 100 configures the precoding granularity in the time domain coarser when the restriction of the number of times of blind decoding of PDCCH or the number of CCEs is large. As a result, the occurrence in which PDCCH is not mapped due to restriction of the number of times of blind decoding or the number of CCEs can be reduced.

Note that, in the above embodiments, the method for determining the precoding granularity in the time domain may be applied to PDCCH (e.g., non-repeated PDCCH) that is not PDCCH repetition. For example, in the case where the precoding granularity has a plurality of PDCCHs in the period thereof, base station 100 applies the same precoding to the plurality of PDCCHs, even when the PDCCHs have different contents, or directed to different users. As a result, terminal 200 can use a large number of DM-RSs for channel estimation, by using the PDCCHs having different contents or the PDCCHs directed to different users, which enables enhancement of channel estimation accuracy.

In the above embodiments, the precoding granularities illustrated in FIGS. 6A, 6B, 7, 8, 10, 12, 13, and 14 are merely examples, and precoding granularities are not limited to these illustrated values.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A base station according to one aspect of the present disclosure includes: control circuitry, which, in operation, configures a precoding granularity indicating a period in which the same precoding is used, for a plurality of control channels mapped in different time resources; and transmission circuitry, which, in operation, transmits a signal of the plurality of control channels to a terminal based on the configured precoding granularity.

In the base station according to one aspect of the present disclosure, a parameter indicating the precoding granularity is indicated from the base station to the terminal.

In the base station according to one aspect of the present disclosure, the precoding granularity is uniquely associated with another parameter to be indicated to the terminal other than the precoding granularity.

In the base station according to one aspect of the present disclosure, the other parameter is an Aggregation Level of the control channel.

In the base station according to one aspect of the present disclosure, the other parameter is a REG bundle size in a control resource set where the control channel is mapped.

In the base station according to one aspect of the present disclosure, the other parameter is the number of symbols in a control resource set where the control channel is mapped.

In the base station according to one aspect of the present disclosure, the other parameter is the precoding granularity for the control channel in a frequency domain.

A terminal according to one aspect of the present disclosure includes: control circuitry, which, in operation, identifies a precoding granularity indicating a period in which the same precoding is applied, the precoding granularity being configured for a plurality of control channels mapped in different time resources; and reception processing circuitry, which, in operation, performs reception processing on a signal of the plurality of control channels transmitted from a base station, based on the identified precoding granularity.

A communication method according to one aspect of the present disclosure includes: configuring a precoding granularity indicating a period in which the same precoding is used, for a plurality of control channels mapped in different time resources; and transmitting a signal of the plurality of control channels to a terminal based on the configured precoding granularity.

A communication method according to one aspect of the present disclosure includes: identifying a precoding granularity indicating a period in which the same precoding is used, the precoding granularity being configured for a plurality of control channels mapped in different time resources; and performing a reception processing on a signal of the plurality of control channels transmitted from the base station, based on the identified precoding granularity.

The disclosure of Japanese Patent Application No. 2018-130546 filed on Jul. 10, 2018 including the specification, drawing and abstract is incorporated herein by reference in its entirety.

INDUSTRIAL APPLICABILITY

One embodiment of the present disclosure is useful for a mobile communication systems.

REFERENCE SIGNS LIST

100 Base station
101 Scheduler
102, 207 Data generator
103 Control information generator
104, 205 Control information holder
105, 206 Precoding controller
106, 210 Coder and modulator
107 Precoder
108, 211 Transmitter
109, 201 Receiver
110, 202 Extractor
111, 204 Demodulator and decoder
112 Quality estimator
200 Terminal
203 Channel estimator
208 Reference signal generator
209 Feedback information generator

The invention claimed is:

1. A base station, comprising:
control circuitry, which, in operation, configures a precoding granularity that is information on time resources to which one precoding is applied among a plurality of time resources used for a repetition of control information; and
transmission circuitry, which, in operation, performs the repetition to a terminal based on the configured precoding granularity, wherein:
the precoding granularity is uniquely associated with a Resource Element Group (REG) bundle size in a control resource set where the control information is mapped,
the precoding granularity is negatively correlated with the REG bundle size such that the precoding granularity becomes finer as the REG bundle size increases, and
the base station implicitly indicates the precoding granularity to the terminal by indicating the REG bundle size to the terminal.

2. A terminal, comprising:
control circuitry, which, in operation, identifies a precoding granularity that is information on time resources to which one precoding is applied among a plurality of time resources used for a repetition of control information; and
reception processing circuitry, which, in operation, performs reception processing on the control information transmitted by the repetition from a base station, based on the identified precoding granularity, wherein:
the precoding granularity is uniquely associated with a Resource Element Group (REG) bundle size in a control resource set where the control information is mapped,
the precoding granularity is negatively correlated with the REG bundle size such that the precoding granularity becomes finer as the REG bundle size increases, and
the precoding granularity is implicitly indicated by the base station to the terminal by indication, by the base station, of the REG bundle size to the terminal.

3. A communication method, comprising:
configuring a precoding granularity that is information on time resources to which one precoding is applied among a plurality of time resources used for a repetition of control information; and
performing the repetition to a terminal based on the configured precoding granularity, wherein:
the precoding granularity is uniquely associated with a Resource Element Group (REG) bundle size in a control resource set where the control information is mapped,
the precoding granularity is negatively correlated with the REG bundle size such that the precoding granularity becomes finer as the REG bundle size increases, and
a base station implicitly indicates the precoding granularity to the terminal by indicating the REG bundle size to the terminal.

4. A communication method, comprising:
identifying a precoding granularity that is information on time resources to which one precoding is applied among a plurality of time resources used for a repetition of control information; and
performing reception processing on the control information transmitted by the repetition from a base station, based on the identified precoding granularity, wherein:
the precoding granularity is uniquely associated with a Resource Element Group (REG) bundle size in a control resource set where the control information is mapped,
the precoding granularity is negatively correlated with the REG bundle size such that the precoding granularity becomes finer as the REG bundle size increases, and
the precoding granularity is implicitly indicated by the base station to a terminal by indication, by the base station, of the REG bundle size to the terminal.

* * * * *